Figure 1:
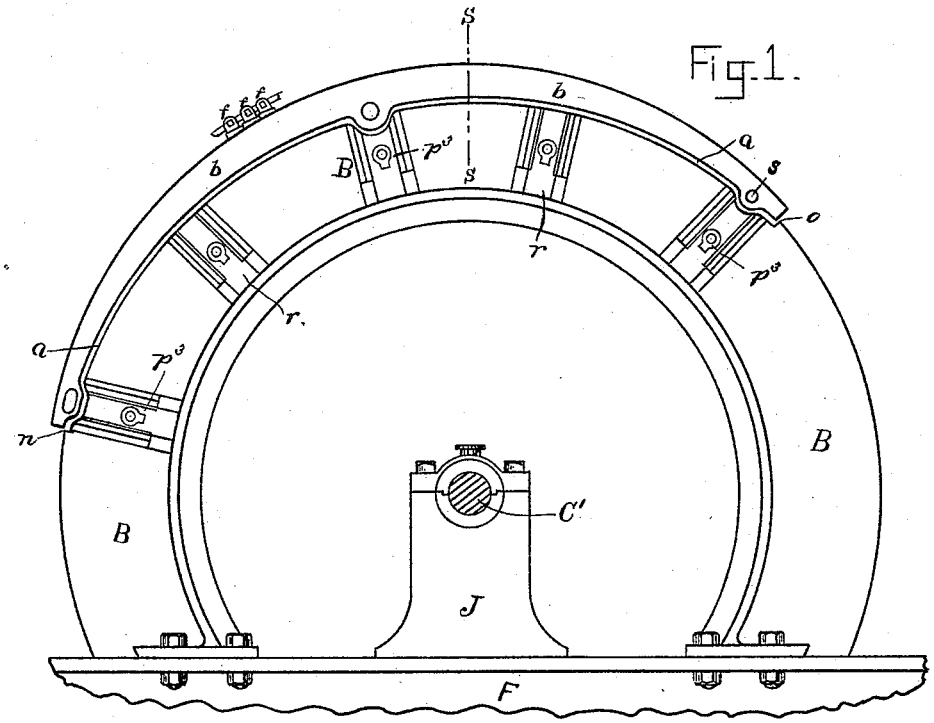

(No Model.) 2 Sheets—Sheet 1.

W. P. CANNING & C. WHITAKER.
TRAVELING FLAT CARDING ENGINE.

No. 451,416. Patented Apr. 28, 1891.

WITNESSES:
W. T. Hodges
Fred Woodies

INVENTORS:
Wm. P. Canning
Channing Whitaker (No Model.) 2 Sheets—Sheet 2.

W. P. CANNING & C. WHITAKER.
TRAVELING FLAT CARDING ENGINE.

No. 451,416. Patented Apr. 28, 1891.

Witnesses:
E. D. Smith
Abram Macauley

Inventors:
William P. Canning
and
Channing Whitaker
by Channing Whitaker,
Attorney.

UNITED STATES PATENT OFFICE.

WILLIAM P. CANNING, OF LOWELL, AND CHANNING WHITAKER, OF TYNGSBOROUGH, ASSIGNORS TO THE LOWELL MACHINE SHOP, OF LOWELL, MASSACHUSETTS.

TRAVELING-FLAT CARDING-ENGINE.

SPECIFICATION forming part of Letters Patent No. 451,416, dated April 28, 1891.

Application filed July 31, 1890. Renewed April 4, 1891. Serial No. 387,627. (No model.)

*To all whom it may concern:*

Be it known that we, WILLIAM P. CANNING and CHANNING WHITAKER, citizens of the United States, residing, respectively, at Lowell and at Tyngsborough, both in the county of Middlesex and the State of Massachusetts, have jointly invented a new and useful Improvement in Traveling-Flat Carding-Engines, of which the following is a specification.

Our invention relates to traveling-flat carding-engines, and more particularly to those that contain flexible bends, which flexible bends, when they are in position in the machine, assembled and completed in order for work, can be described substantially as follows: The surface of each flexible bend which is farthest from the axis of the main cylinder is a truly cylindrical surface, or substantially so, having its axis in the same straight line with the axis of the main cylinder. This surface of each flexible bend is a surface upon which the traveling flats slide when the machine is in operation. These flexible bends have pivotal bearings near their ends and centers. The central pivotal bearings may be cylindrical or knife-edged, and the holes for the end pivotal bearings may be either circumferential slots or round. The flexible bends are enlarged near the pivotal bearings in the direction of lines passing through the centers of those bearings and normal to the upper cylindrical surfaces of the flexible bends. Between these enlargements the flexible bends taper from the neighborhood of the central to that of the end bearings, when measured along lines that are normal to the upper cylindrical surface of the flexible bends. Previous to our invention it has been customary to locate at least one such flexible bend upon one or the other side of each of the main bends of any carding-engine of the class to which our invention particularly relates. This, however, causes the main bend and the flexible bend carried thereby to occupy a space that in the dimension which is parallel to the axis of the main cylinder is equal to or greater than the sum of the widths or thicknesses of the two bends, adding to the extent of this dimension of the carding-engine and to the floor-space occupied by the engine.

The object of our invention is to secure a more compact arrangement, diminish the lateral space occupied by the bends on each side of the engine, and reduce the floor-area which is occupied by the machine. To this end we remove from the customary form of the main bend that portion of it which in the customary and unaltered form is situated upon one side or the other of the flexible bend in any position of adjustment of the flexible bend, and we place the flexible bend in such position as to stand wholly or partially in the space from which the described portion of the customary form of the main bend has been removed, thereby bringing the flexible bend into the same or approximately the same vertical plane as the main web of the main bend. We thus reduce the space which is occupied by the flexible and the main bends in the dimension which is parallel to the axis of the main cylinder, and with it the same dimension of the floor-area occupied by the machine.

Figure 6:
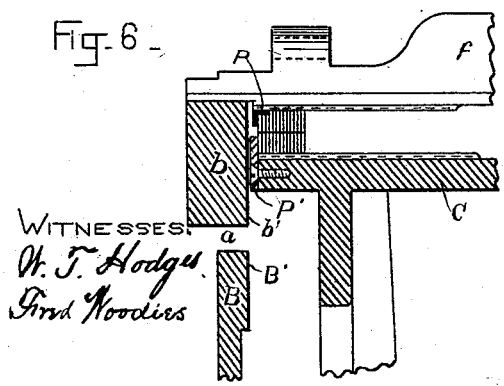
Figure 7:
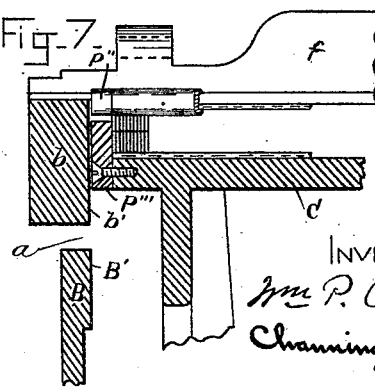
Figure 8:
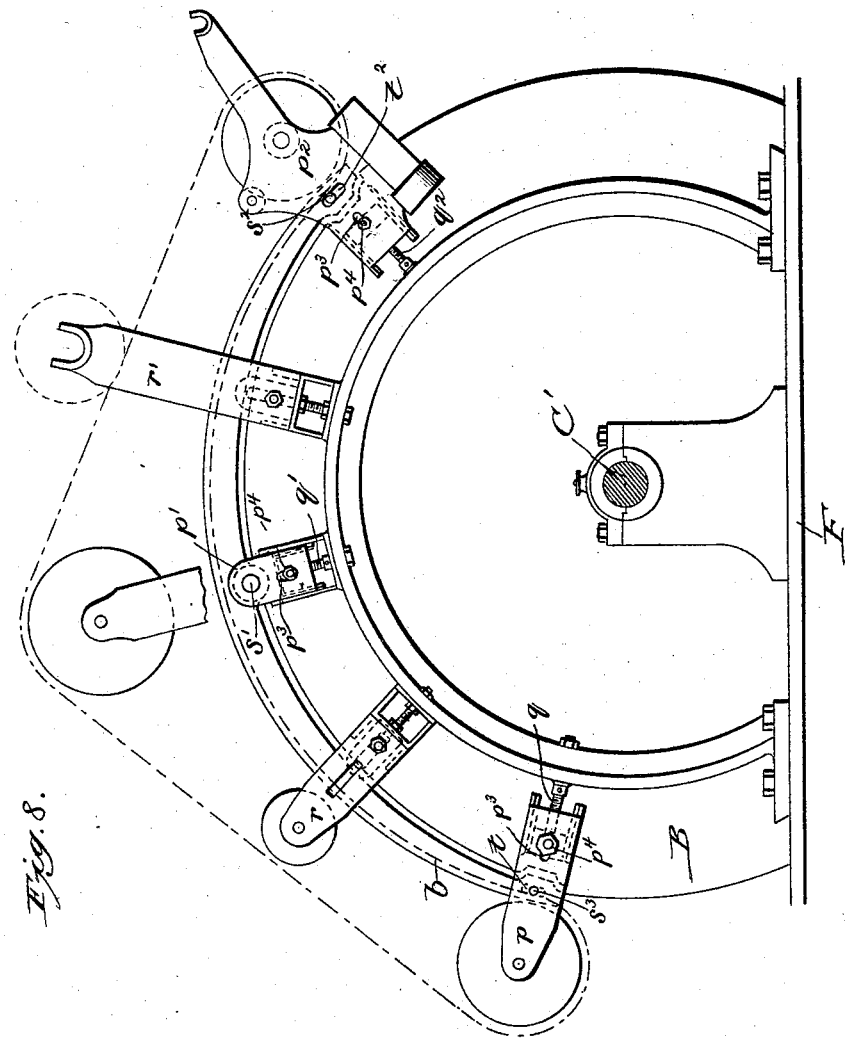

In the accompanying drawings, Figure 1 is a partial side view of a carding-engine to which our invention is applied, the shaft of the main cylinder being shown in section; and Figs. 2, 3, 4, 5, 6, and 7 are partial sections of modified arrangements, taken at about the line *s s* of Fig. 1. Fig. 8 is a view similar to Fig. 1, but showing the connections between the flexible bend and the supporting slides or brackets therefor, indicating the chain of traveling flats by dotted lines, and showing various rollers and supporting-brackets employed in connection with said chain.

In the figures, F represents a part of the frame of the machine; B, the main bend; *b*, the flexible bend; C, the main cylinder; C′, the main-cylinder shaft, and *f f f* are three of the flats of the chain of flats.

As will be seen in Figs. 1 and 8, we remove from the outer or peripheral portion of the main bend B a part thereof extending from the point *n* to the point *o*, corresponding to the length of the flexible bend, leaving a recess into which the flexible bend may be placed, as clearly shown in the said figures, the edge of this recessed portion being shaped to correspond with the under edge of the flexible bend. The flexible bend may be held in place by any of the known supporting and adjusting devices which may prove suitable and desirable. In Fig. 8 we have shown supporting and adjusting slides $p$ $p'$ $p^2$ of a kind in common use. These slides are slotted, as at $p^3$, to permit of adjustment, and are secured in place by bolts and nuts $p^4$. One of these slides—namely, that lettered $p$—is represented as carrying a pin or stud $s$, which is secured to it in a fixed position by one end, while the other end of the stud enters a circumferential slot $t$ in the flexible bend. Another of these slides $p'$ is represented as carrying a stud $s'$, which is secured to it in a fixed position by one end, while the other end of the stud enters a round hole in the flexible bend. The third slide or bracket $p^2$ is represented as having a slot $t^2$, into which the pin $s^2$ enters, the pin being secured to the flexible bend in a fixed position. In connecting either end of the flexible bend with its adjacent adjusting and supporting slide or bracket the slot may be in the bracket or the pin may be secured to the latter, as may be preferred. The screws $q$ $q'$ $q^2$, if turned one way or the other, cause the slides or brackets to move toward or away from the axis of the main cylinder. The slides or brackets lettered $r$ $r$ are those which in practice support the grinding-roller and the roller by which the chains carrying the flats are tightened.

By removing a portion of the main bend and placing the flexible bend in the recess thus formed we are enabled to bring both the said bends into the same or approximately the same vertical plane, as hereinbefore stated.

Figure 2:
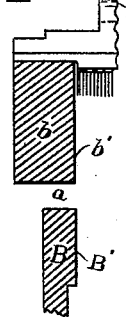
Figure 3:
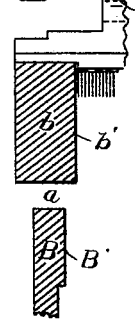
Figure 4:
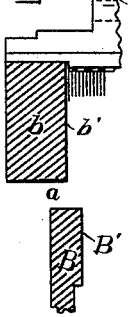
Figure 5:
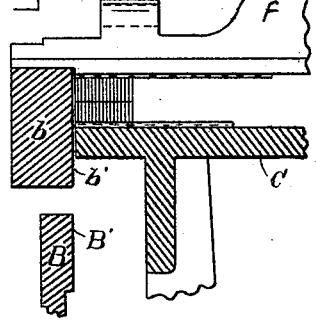

In Fig. 2 the inner face $b'$ of the flexible bend $b$ is in the same plane with the inner face $B'$ of the main bend $B$. Although we prefer it, we do not confine ourselves precisely to this position and arrangement of the inner faces of the flexible and main bends. Sometimes we place the inner face $b'$ of the flexible bend nearer to the center of the machine than the inner face $B'$ of the main bend, as is represented in Fig. 3. Sometimes we place the inner face $b'$ of the flexible bend farther from the center of the machine than the inner face $B'$ of the main bend, as is represented in Fig. 4. We never place the two surfaces $b'$ and $B'$ so far apart as to remove the flexible bend $b$ out of the space which has previously been described as made for it in the main bend $B$. In Fig. 5 the flexible bend is as near to the outer edges of the working-surfaces, of the card-clothing as it can be placed, and this gives the most compact arrangement of the parts of the card. In Fig. 6 the flexible bend is removed a short distance from the outer edges of those working-surfaces, in order to permit the use of protectors of those edges. Two well-known forms of such protectors, which form no part of this invention, are herein shown. One of these protectors consists of a ring or plates P', secured by screws to the end of the cylinder C and projecting at the side of the teeth on the cylinder to or near the points thereof. The other of these protectors P' consists of an angle-plate placed upon the leather or other backing of the card-clothing of each of the flats and screwed or riveted in place, one portion thereof standing in a vertical plane parallel with the teeth upon the said card-clothing. Any other good forms of protectors may be substituted. In Fig. 7 the flexible bend is removed still farther from the outer edge of the working surfaces of the card-clothing, in order to permit the use of a wider well-known form of protector for the outer edge of the working-surface of the card-clothing on the flats, which form of protector forms no part of this invention. This protector P'' consists of a short piece of iron or steel wire of rectangular section. The leather or other backing of the card-clothing of the flat is extended outward beyond the teeth of the said clothing between the wide face of the flat and the protector P'', and the ends of the protector P'' are bent around the edges of the flat and compressed into narrow grooves which run lengthwise of the flat near to the edges of the wide flange to which the clothing is fastened. Another protector (represented in Fig. 7) consists of a ring or plates P''', screwed to the end of the cylinder and extending alongside of and parallel with the teeth on the cylinder and flats. In all of these figures between the outline of the flexible bend $b$ and the outline of the main bend $B$ there is a space $a$ $a$. This space is wide enough, measured in a direction normal to the upper cylindrical surface of the flexible bend, to permit such movements of any and of all the parts of the flexible bend toward the axis of the main cylinder as may be necessary as the wire of the clothing of the flats and of the main cylinder is worn and ground away. The dimension of the space $a$ $a$, measured on normal lines, may be uniform or not, as is desired. We generally prefer to have this dimension uniform. It may here be remarked that the space $a$ will in practice be found to permit of the movement of the currents of air generated in the movement of the parts of the carding-engine.

We are aware that many arrangements and contrivances have been devised with a view to supporting and guiding the traveling flats of carding-engines in proper working relation to the surfaces of the cylinders; but we are not aware of the existence prior to our present invention of any construction wherein a flexible bend is compactly arranged in a recess at the outer part or periphery of the main bend and in the same or substantially the same plane as the main web of the latter, as in our present invention. We are aware that it has been proposed to cause the flats to rest upon and slide around a portion of the periphery of the main bend; but in this case the flexible bend and provisions for adjusting the same into proper position relatively to the axis of the cylinder have been wanting. We are aware, also, that it has been proposed to place upon the exterior peripheries of the main bends of carding-engines one or more thin strips of metal, upon which the ends of the flats are intended to slide, the said strips being made detachable, in order that wear may be compensated for by the removal of a strip. We are also aware that it has been proposed to form the exterior peripheries of the main bends as spiral cams and to place thereon flexible bends adjustable on said cams and each having one edge formed to correspond with a cam and the other edge of the form of an arc of a circle, the center of which is in the axis of the main cylinder. However, all of these three constructions differ from our present invention in obvious respects, none of them employing the flexible bend herein shown and described.

We are also aware that it has been proposed to form the flexible bend of a carding-engine angular or L-shaped in cross-section, with the horizontal flange thereof extending over the main web of the main bend and receiving the ends of the traveling flats, which slide thereon; but in this construction the main part of the bend, including the vertical flange thereof, lies entirely outside the plane of the main web of the main bend, and in consequence the parts, including the adjusting devices for the flexible bend, occupy as much lateral space as the ordinary construction herein described.

We are also aware that it has been proposed to guide the ends of the flats by a strip of metal resting upon the heads of a series of pins sliding in flanges of the main bend and resting at their inner ends upon the outer surface of a segmental wedge capable of being moved to affect the radial adjustment of the said pins or to permit the ends of the flats to slide upon the enlarged heads of the said pins. In this construction there is no economy of space, and the objects of our present invention are not secured.

Having described our invention, we claim—

1. The combination, with the main bend notched or recessed in the outer portion or periphery thereof for the reception of the flexible bend, of the flexible bend located in the recess in the same or approximately the same vertical plane as the main web of the main bend.

2. The combination, with the main bend notched or recessed in the outer portion or periphery thereof for the reception of the flexible bend, of the flexible bend located in the recess in the same or approximately the same vertical plane as the main web of the main bend, and devices carried by the main bend for supporting the flexible bend.

3. The combination, with the cylinder, the flats, and the main bend notched or recessed in the outer portion or periphery thereof for the reception of the flexible bend, of the flexible bend located in the recess in the same or in approximately the same vertical plane as the main web of the main bend and in close proximity to the outer edges of the card-clothing on the cylinder and flats.

WM. P. CANNING.
CHANNING WHITAKER.

Witnesses:
W. T. HODGES,
FRED WOODIES.